Sept. 17, 1946.  R. W. DEXTER ET AL  2,407,631
PISTON
Filed March 12, 1945  2 Sheets-Sheet 1
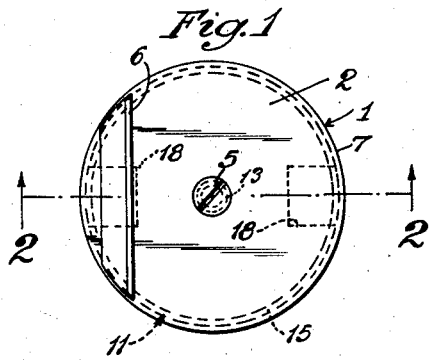
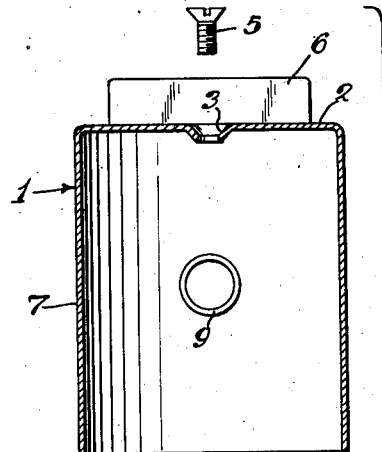
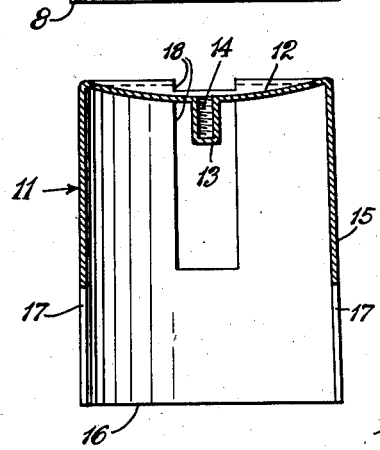
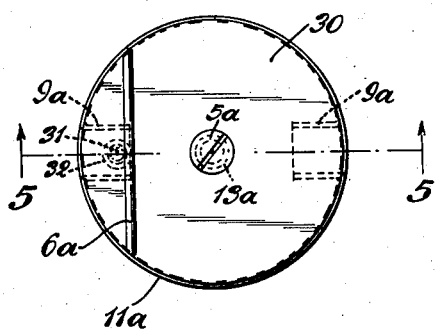
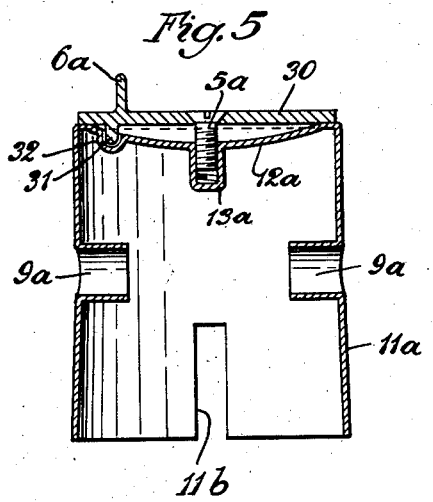
Inventors
Roger W. Dexter
Peter L. Loewe
by Parker & Carter
Attorneys.

Sept. 17, 1946.                R. W. DEXTER ET AL                    2,407,631
                                    PISTON
                           Filed March 12, 1945              2 Sheets-Sheet 2
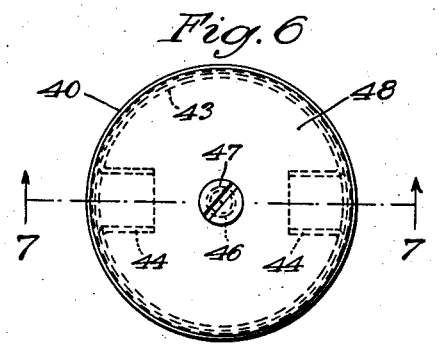
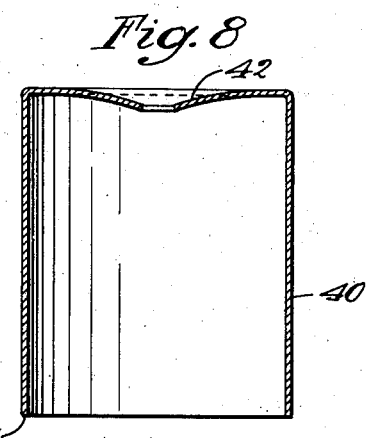
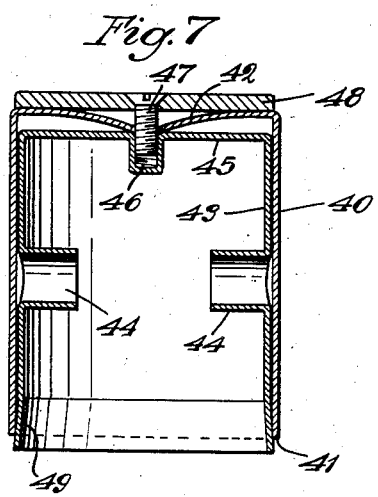
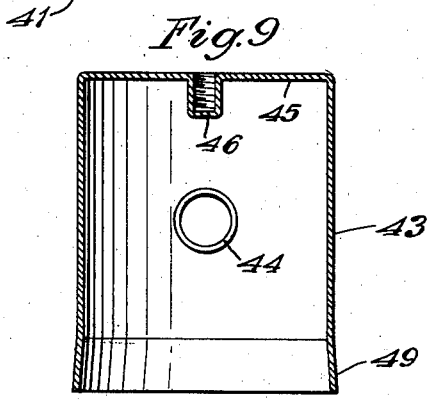
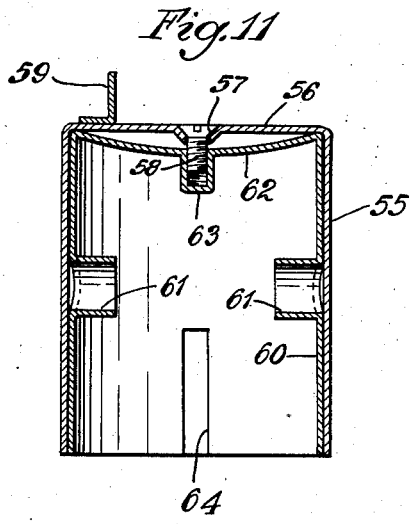
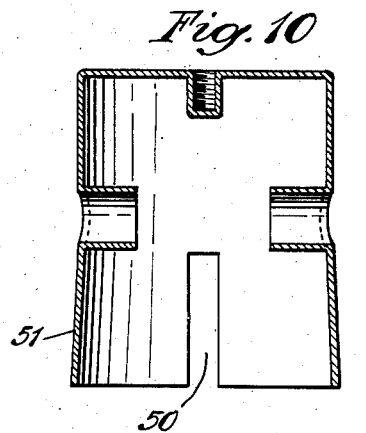
Inventors
Roger W. Dexter
Peter L. Loewe
by Parker & Dexter
Attorneys.

Patented Sept. 17, 1946

2,407,631

UNITED STATES PATENT OFFICE 2,407,631

PISTON

Roger W. Dexter and Peter L. Loewe, Chicago, Ill.

Application March 12, 1945, Serial No. 582,200

14 Claims. (Cl. 309—10)

Our invention relates to an improvement in piston structures and has for one purpose to provide a piston with adjustable diameter.

Another purpose is to provide a piston structure adaptable for close tolerances such as are necessary for example in small engines and the like.

Another purpose is to provide a piston which may be advantageously used in small gasoline engines.

Another purpose is to provide a light efficient piston structure which is inexpensive to manufacture and install.

Another purpose is to provide a piston structure the effective diameter of which may be varied or adjusted.

Another purpose is to provide a piston whose diameter can be changed to suit a given bore and which is inexpensive to install.

Other purposes will appear from time to time in the course of the specification and claims.

The invention is illustrated more or less diagrammatically in the accompanying drawings wherein:

Figure 1 is an end elevation of the structure embodying our invention;

Figure 2 is a section on the line 2—2 of Figure 1;

Figure 3 is a section on the line 3—3 of Figure 1, illustrating the inner and outer piston elements separately;

Figure 4 is an end elevation of a variant form of our invention;

Figure 5 is a section on the line 5—5 of Figure 4;

Figure 6 is an end elevation of a variant form;

Figure 7 is a section on the line 7—7 of Figure 6;

Figure 8 is an axial section through the piston shell of Figure 7;

Figure 9 is an axial section through the insert or expander of Figure 7;

Figure 10 is an axial section through a variant form of expander adapted for use with the piston shell of Figure 7; and Figure 11 is an axial view through a variant structure.

Like parts are indicated by like symbols throughout the specification and drawings.

Referring first to the form of Figures 1 and following 1 generally indicates a piston element of relatively thin metal which may for example be drawn from sheet stock. It includes an end portion 2 having an axial aperture 3 surrounded by an inwardly offset wall portion adapted to serve as a socket to receive the head of the screw 5. 6 is any suitable transverse partition or wall member upwardly extending from the end wall 2 of the piston. It is useful for example when a piston is used in connection with a two cycle engine. The circumferential side wall 7 of the piston terminates in an edge 8. 9 are diametrically opposed inwardly extending pin receiving sleeves or bearings.

11 generally indicates an expander adapted for insertion into the interior of the piston 1. It includes a concave end wall 12 having a central cup 13 internally screw threaded at 14 to receive the threads of the screw 5. The side wall 15 of the expander is slightly conic or tapered, with the diameter progressively increasing toward the free edge 16 of the expander. The lower portion or skirt of the expander may be slotted as at 17. The upper portion may likewise be slotted as at 18 with the slots continuing inwardly from the edge of the end wall 12 sufficiently to permit the expander to be inserted, the slots 18 being adapted to receive the inwardly extending sleeves 9 of the piston 1.

In assembling the piston the expander 11 is inserted in the piston 1, the screw 5 is positioned with its screw threaded portion extending through the aperture 3 of the piston end wall 2. The screw is then rotated, with the threads engaging the threads 14 of the cup 13, in such fashion as more or less to flatten or reduce the concavity of the expander end wall 12. The result is an outward expansion or an increase in the effective outside diameter of the side wall 7 of the piston 1, about an area adjacent its end wall 2. At the same time the outward flare of the skirt 15 of the expander 11 increases the effective diameter of that portion of the piston which is adjacent the free edge 8. The effective outside diameter of the piston 1 may thus be varied by rotation of the screw 5. This permits adjustment for initial assembly. It also permits adjustment or take up for wear. Note also that there is no leakage about the screw 5, since its threaded portion extends into the closed cup 13. No piston rings need be employed, and a piston which is highly accurate to close tolerances is provided.

Referring to Figures 4 and 5, we illustrate a piston in which a side wall 11a is formed with inwardly extending pin receiving sleeves 9a. The piston element is formed of a concavo convex end wall 12a provided with a central cup 13a screw threaded to receive a screw 5a which extends through a central aperture in a plate 30. The plate 30 may be formed of any suitable material and may for example be a die casting. It may be formed of any desired contour and may for example have the upwardly extending separating wall 6a. It may advantageously have a downwardly extending element 31 interpenetrating with a pocket 32 in the end wall 12a, whereby relative rotation of the plate 30 and the rest of the piston structure is prevented. The free edge portion of the piston may be of somewhat outwardly flared design, to provide pressure against the inner face of the cylinder. It may also be slotted, as at 11b.

Referring to the form of Figures 6 to 9 we illustrate a multiple part piston structure. It may include the outer piston shell 40 with its free edge 41 and its concavo-convex end closure wall 42. The expander 43 has crank pin receiving sleeves 44 extending inwardly therefrom. The side wall of the piston shell 40 is unbroken and unslotted. The end wall 45 of the insert or expander has a cup 46 screw threaded to receive the screw 47 which passes through an axial aperture in the end plate 48. As the screw 47 is rotated, it is effective to move the members 45 and 48 toward and away from each other. The result is an increase or decrease of the concavity of the piston shell end wall 42, and a consequent variation in the effective outside diameter of the piston shell. The insert 43 is shown as having a flared end skirt portion 49. Thus as the insert is moved toward or away from the plate 48, the free edge 41 of the piston shell is expanded, and at the same time the opposite end of the piston shell is expanded by the partial flattening of the end wall 42, in response to tightening of the screw 47. Similarly, when the screw 47 is loosened the effective outside diameter of the piston shell 40 is reduced simultaneously at both ends. If desired, as shown in Figure 10, the insert may be longitudinally slotted as at 50 and may be provided with a generally conic end portion 51 of greater length than the conic portion 49 of Figure 7.

In the form of Figure 11 the piston shell 55 is provided with a flat end wall 56 apertured as at 57 to receive the screw 58. 59 is any suitable outer projection, wall or the like, useful where the piston is employed in a two cycle engine. The insert 60 has integral inwardly extending crank pin receiving sleeves 61. It has a concavo-convex end wall 62 with the screw receiving cup 63. It may be slotted at its lower end as at 64. Since the sleeves 61 are on the inner of the two piston members, the outer member 55 may be unbroken from end to end.

It will be realized that, whereas, we have described and illustrated a practical and operative device, nevertheless many changes may be made in the size, shape, number and disposition of parts without departing from the spirit of the invention. We therefore wish our description and drawings to be taken as in a broad sense illustrative or diagrammatic, rather than as limiting us to our precise showing.

The use and operation of our invention are as follows:

The success and efficiency of any internal combustion engine, or of any pump or compressor, is governed largely by the accuracy of the fit of the piston and the cylinder walls. This feature becomes increasingly important as the diameter of the piston is decreased. To take a particular field as an example, model engines, such as the single cylinder two cycle air cooled model aircraft engines, are generally designed with pistons of less than one inch in diameter. In such cases piston rings have never been found satisfactory. The biggest single problem facing the manufacturer of such small engines is the means for obtaining a sufficiently close tolerance between the piston and cylinder walls to obtain required compression. The same problem exists in small pumps or compressors, such as are used in refrigerators, and in other equipment where a piston of relatively small diameter is employed. Since the piston structure herein shown may be used with a variety of structures, we have illustrated only diagrammatically, as at A, a cylinder structure with which the piston may be used. We also illustrate any suitable piston pin B, and do not further illustrate the details of the device with which the piston is to be employed.

Taking small engine pistons as an example, tolerances as close as .0002" may be necessary. It is a highly expensive matter to grind and lap such pistons. Most manufacturers, producing engines having pistons under one inch in diameter, use heat treated steel cylinder liners and steel stamped or deep drawn pistons which are used in the soft state. We have developed a piston design, and a method of piston manufacture, which are highly efficient, and which result in a piston which is relatively cheap and easy to make and assemble, which is efficient in use, and which can be adjusted or taken up for assembly and for wear. As the expander 11 is drawn by the screw 5 inwardly against the piston end wall 2, the exterior diameter of the piston is increased somewhat at each end, there being in effect a line contact at each end of the piston. After a period of use, even though it may be necessary to rehone the cylinder liner, the piston need not be replaced. All that is necessary is to rotate the screw 5 sufficiently to draw the expander further into the piston and to increase the thrust of the expander outwardly against the piston. This results from the reduction in the concavity of the expander end wall 12 in response to rotation of the screw 5.

The other forms show variations of the same general piston structure. In Figures 4 and 5 we employ a single cylinder shell without an internal expander. This shell has a concavo-convex end wall 12a which may be moved toward and away from the abutment 30 by the screw 5a. Relative rotation of the members 12a and 30 is prevented by the interfitting portions 31 and 32. The sleeves 9a, for the piston pin, are shown as integral with the circumferential side wall of the piston shell.

In the form of Figures 6 to 10 we employ an outside piston shell having an unbroken circumferential side wall 40, which need not be slotted. The piston pin receiving sleeves 44 extend inwardly from an internal member or expander 43. However, the shell 40 is provided with a concavo-convex end wall 42. As will be clear from Figure 7 if the screw 47 is tightened the result is a simultaneous expansion of the diameter of one end of the piston shell caused by the partial flattening of the wall 42, and of the opposite end of the piston because of the expanding effect of the conic portion 49. The expander shown in Figure 10 operates similarly but has a longer flared portion, permitted by the slots 50.

The form of Figure 11 resembles the form of Figure 1 and following but employs an unbroken circumferential piston shell wall 45, which is made possible by positioning the piston pin receiving sleeves 61 on the inner member or expander 60.

In all forms of the device a pair of opposed piston end walls are employed, at least one of which is concavo-convex, in connection with means, such as a screw, for varying the convexity of the concavo-convex member, and for thereby varying the effective outside diameter of the piston structure. It is a matter of choice as to whether the concavo-convex wall is employed on the piston shell proper, as in Figure 5 and Figure 7, or on some insert or expander, as in Figures 2 and 11.

One advantage of having the piston pin receiving sleeves on the inner shell or expander is the avoidance of any break in the piston wall which contacts the cylinder liner. This is an advantage in connection with lubrication and prevents the wiping up of oil.

It will be realized that any suitable materials may be employed. The use of sheet metal is advantageous, but thin castings may be employed in whole or in part. Any suitable metals may be used. Whereas we have shown simple threaded screws as the means for varying the concavity of the expanding wall, it will be understood that any other suitable means may be employed for varying the distance between the flat and the concavo-convex members which are employed.

We claim:

1. In a piston structure, a piston shell having a closed end wall and an open end, and means for varying the effective outside diameter of the piston shell, including an inner cylindrical shell having an end wall adjacent to the end wall of the piston, at least one of said end walls being concavo-convex, and means for variably urging said end walls together, and for thereby varying the effective diameter of said concavo-convex end wall.

2. In a piston structure, a piston shell having a closed end and an open end, a cylindrical expander adapted to penetrate the space within the piston shell, and means for urging the expander toward the closed end of the piston shell, with the expander located within and surrounded by the piston shell, and means for expanding the cylindrical expander laterally in response to its movement toward the closed end of the piston shell, and for thereby increasing the exterior diameter of the piston shell.

3. In a piston structure, a piston shell having a closed end and an open end, a cylindrical expander adapted to penetrate the space within the piston shell, and means for urging the expander toward the closed end of the piston shell, with the expander located within and surrounded by the piston shell, and means for expanding the cylindrical expander laterally in response to its movement toward the closed end of the piston shell, and for thereby increasing the exterior diameter of the piston shell, including a threaded element in threaded relation with said expander and with the closed end of the piston shell.

4. In a piston structure, a piston shell having a side wall, a closed end wall and an open end, an expander adapted to penetrate the space within the piston shell, and having an end wall opposed to the closed end wall of the piston shell, at least one of said opposed end walls being flexible and concavo-convex, and means for urging said walls toward or away from each other, and for thereby varying the concavity of the concavo-convex end wall, and the effective outside diameter of the piston shell.

5. In a piston structure, a piston shell having a side wall, a closed end wall and an open end, an expander adapted to penetrate the space within the piston shell, and having an end wall opposed to the closed end wall of the piston shell, at least one of said opposed end walls being flexible and concavo-convex, and means for urging said walls toward or away from each other, and for thereby varying the concavity of the concavo-convex end wall, and the effective outside diameter of the piston shell, said expander having a side wall opposed to the inner face of the side wall of the piston shell.

6. In a piston structure, a piston shell having a side wall, a closed end wall and an open end, an expander adapted to penetrate the space within the piston shell, and having an end wall opposed to the closed end wall of the piston shell, at least one of said opposed end walls being flexible and concavo-convex, and means for urging said walls toward or away from each other, and for thereby varying the concavity of the concavo-convex end wall, and the effective outside diameter of the piston shell, said expander having a side wall opposed to the inner face of the side wall of the piston shell of an effective diameter increasing toward the open end of the piston shell.

7. In a piston structure, a piston shell having a side wall, a closed end wall and an open end, an expander adapted to penetrate the space within the piston shell, and having an end wall opposed to the closed end wall of the piston shell, at least one of said opposed end walls being flexible and concavo-convex, and means for urging said walls toward or away from each other, and for thereby varying the concavity of the concavo-convex end wall, and the effective outside diameter of the piston shell, including a screw in threaded relation with both end walls.

8. In a piston structure, a piston shell having a side wall, a closed end wall and an open end, an expander adapted to penetrate the space within the piston shell, and having an end wall opposed to the closed end wall of the piston shell, at least one of said opposed end walls being flexible and concavo-convex, and means for urging said walls toward or away from each other, and for thereby varying the concavity of the concavo-convex end wall, and the effective outside diameter of the piston shell, including a screw in threaded relation with both end walls, the inner of said end walls having an internally screw threaded cup adapted to receive the end of said screw, whereby leakage about the screw is prevented.

9. In a piston structure, a piston shell having a side wall, a closed end wall and an open end, said closed end wall being concavo-convex, and means for varying the convexity of said end wall, and for thereby varying the effective outside diameter of the piston.

10. In a piston structure, a piston shell having a side wall, a closed end wall and an open end, said closed end wall being concavo-convex, and means for varying the convexity of said end wall, and for thereby varying the effective outside diameter of the piston, including an abutment opposed to the circumferential portion of said end wall and means for moving the central portion of said end wall toward and away from said abutment.

11. In a piston structure, a piston shell having a generally cylindrical circumferential side wall, a closed end wall unitary therewith and an open end, said piston end wall having an axially located screw receiving aperture, an expander having a circumferential side wall and an end wall and an open end, said expander end wall having a screw threaded portion, a screw extending through the aperture in the piston end wall and in threaded relationship with the screw threaded portion of the expander end wall, said screw being adapted, in response to its rotation, to draw said expander toward the piston end wall.

12. In a piston structure, a piston shell having a generally cylindrical circumferential side wall, a closed end wall unitary therewith and an open end, said piston end wall having an axially located screw receiving aperture, an expander having a circumferential side wall and an end wall and an open end, said expander end wall having a screw threaded portion, a screw extending through the aperture in the piston end wall and in threaded relationship with the screw threaded portion of the expander end wall, said screw being adapted, in response to its rotation, to draw said expander toward the piston end wall, said expander having a progressively increased diameter toward its open end.

13. In a piston structure, an outer piston shell having a cylindrical side wall, a closed end wall and an open end, and means for varying the effective outside diameter of the piston, including an inner piston shell having a cylindrical side wall and an end wall, one of said end walls being concavo-convex, and means for urging the inner piston shell toward the closed end of the outer piston shell and for thereby expanding one of said concavo-convex walls and thus varying the effective outside diameter of the outer shell.

14. In a piston structure, an outer piston shell having a cylindrical side wall, a closed end wall and an open end, and means for varying the effective outside diameter of the piston, including an inner piston shell having a cylindrical side wall and an end wall, one of said end walls being concavo-convex, and means for urging the inner piston shell toward the closed end of the outer piston shell, and for thereby expanding one of said concavo-convex walls and thus varying the effective outside diameter of the outer shell, the side wall of said inner shell having inwardly extending piston pin receiving sleeves.

ROGER W. DEXTER.
PETER L. LOEWE.